United States Patent [19]

Thompson, Sr.

[11] Patent Number: 4,723,637
[45] Date of Patent: Feb. 9, 1988

[54] TORQUE LIMITED BRAKE

[75] Inventor: Bernard B. Thompson, Sr., Bainbridge Island, Wash.

[73] Assignee: The Boeing Company, Seattle, Wash.

[21] Appl. No.: 815,546

[22] Filed: Jan. 2, 1986

[51] Int. Cl.⁴ .............................................. B60T 8/52
[52] U.S. Cl. ................................. 188/181 T; 303/112
[58] Field of Search .......................... 188/180, 181 T; 303/112, 113

[56] References Cited

U.S. PATENT DOCUMENTS

| | | |
|---|---|---|
| 2,239,459 | 4/1941 | Kattwinkel ................. 188/181 T X |
| 2,849,086 | 8/1958 | Martin .......................... 188/181 T X |
| 2,904,136 | 9/1959 | Greenough . |
| 2,909,047 | 10/1959 | Walterscheid-Müller et al. . |
| 3,132,730 | 5/1964 | Dahlstrand et al. . |
| 3,404,758 | 10/1968 | Mortimer ......................... 188/181 T |
| 3,419,117 | 12/1968 | Conway . |
| 3,643,770 | 2/1972 | Faulds . |
| 3,651,900 | 3/1972 | Feikema ......................... 188/181 T |
| 3,724,610 | 4/1973 | Caero . |
| 3,923,345 | 12/1975 | Poggie . |
| 3,953,081 | 4/1976 | King . |
| 4,081,063 | 3/1978 | Malmros et al. . |
| 4,102,154 | 7/1978 | Dahlstrand, Jr. . |
| 4,129,202 | 12/1978 | Winters et al. . |
| 4,265,343 | 5/1981 | Stevens . |
| 4,296,897 | 10/1981 | Thompson . |
| 4,417,650 | 11/1983 | Geisthoff . |
| 4,441,589 | 4/1984 | Stevens . |

Primary Examiner—Duane A. Reger
Attorney, Agent, or Firm—Christensen, O'Connor, Johnson & Kindness

[57] ABSTRACT

In a vehicular brake system such as for use in a commercial aircraft, a torque limiter for maintaining the torque supplied by the braked wheels below a predetermined maximum value. The torque limiter includes a plurality of torque pistons which sense the torque of the wheels and operate in response to a torque value greater than the desired value to isolate the metered brake fluid within the brake cylinders and subsequently reduce the pressure of the brake fluid within the brake cylinders to release the brakes and decrease torque. The torque pistons are mounted in a piston carrier and extend from the piston carrier to engage notches formed in a torque arm housing that at least partially surrounds the piston carrier. Torque piston movement is initiated by relative rotational movement between the piston carrier and torque arm housing caused by an excessive reaction torque from the vehicle structure to the torque produced by the brakes. A valve means is associated with each torque piston such that upon a predetermined degree of movement of the torque pistons, the valve means isolates the brake cylinders from the metered brake fluid input and upon subsequent motion of the torque pistons an expansion chamber is created which accepts a portion of the fluid trapped in the brake cylinders thereby relieving pressure in the brake cylinders and releasing the brakes to reduce brake torque.

7 Claims, 4 Drawing Figures

TORQUE LIMITED BRAKE

BACKGROUND OF THE INVENTION

This invention relates to torque limited brakes, and more particularly to brakes that are torque limited through mechanical rather than electronic sensing and control means. While the invention will be described with relation to commercial aircraft, it will be understood by those of skill in the art that the principles of the present invention can be applied to brakes on other vehicles besides aircraft.

As a vehicle, such as an airplane, is braked to a stop, such as upon landing or during an aborted takeoff, ground reaction causes the wheels to develop a torque which is passed through the brake rotor and stator to the strut carrying the wheel or wheels. Therefore, it is necessary to design and build the landing gear and the structure attaching it to an aircraft strong enough to react against the greatest amount of torque that can be produced by the brakes without allowing any damage to the landing gear or aircraft structure. At the same time, the brake must be designed so that it will provide enough stopping power to bring the vehicle, in this case an aircraft, to a halt in the prescribed distance. Moreover, the level of retarding force for any braking condition should be limited to a value that is a function of the pilot's brake pedal force. In other words, the pilot should have a feel of what the brake system is doing. At times, balancing these concerns can be quite difficult, particularly in the case of certain brake materials, such as in the case of carbon disk brakes. Carbon has a widely-varying coefficient of friction, depending on the environmental surroundings in which it must work. In some instances, the coefficient of friction of some carbon brake materials has been shown to vary by a factor of four, between wet and dry, new and worn, and hot and cold conditions. If the brake is designed to provide the necessary stopping force, even at the lowest possible coefficient of friction, it can well be that the torque that is produced when those same brakes are operating at their highest coefficient of friction, will exceed the landing gear design strength. At the same time, if the landing gear is designed to withstand the maximum torque possible from the brakes when operating in circumstances under which the coefficient of friction is greatest, it is necessary to overdesign the landing gear to a point which in turn affects the overall weight of the aircraft since additional structural material is added to the landing gear structure.

In order to handle this balancing of concerns, brake control systems have been designed with torque limiters that ensure that the brake will not apply more than a predetermined maximum torque to the strut under any circumstances. In this way, the strut can be designed to the predetermined maximum torque value rather than the possible much greater torque values that would be produced if the brake were not torque limited. Some prior art systems for torque limiting brakes of aircraft have utlized electronic sensors to measure the torque being applied by the brake. The sensors trigger the electronic control of hydraulic valves to release brake pressure at the point of the design maximum allowable torque. The electronic anti-skid and torque limiting systems are costly to design and manufacture and require redundant power sources to avoid a single failure mode that would cause simultaneous loss of torque control of all brakes on the airplane. It is even more complicated a task to design an electronically controlled torque limiter system that limits the torque as a function of the pilot's brake force input for metered brake pressure. Use of a mechanical torque limiting system enables the brakes to be used on any aircraft without concern over the electrical circuitry associated with the other aircraft systems, and provides a limited torque valve that is a function of the pilot's preferred brake pressure. Moreover, a mechanical torque limiting device within each brake provides a single failure mode that can affect only one brake on a landing gear with multiple wheels and brakes.

It is therefore an object of the present invention to provide an apparatus for limiting the torque that can be applied to a vehicle by a wheel brake and more particularly to such a torque limiter that operates by mechanical means directly associated with the braking mechanism itself.

SUMMARY OF THE INVENTION

In a typical brake system, such as for an aircraft, hydraulic brake fluid under pressure is metered by the pilot's brake pedal and is used to drive a brake piston, which in turn compresses a brake rotor and stator friction and heat sink stack to stop the motion of the wheel. Typically, several brake pistons are arranged circumferentially about the wheel to engage the stator and rotor stack. The brake pistons are housed in a brake piston carrier which is attached to a splined torque tube that carries the brake stators. The rotor friction disks are splined to the wheel and are interleaved with the stator friction disks. Thus, the torque tube receives all of the torque generated by the wheel driving through the brake rotor and stator friction stack. The torque is transmitted to a torque arm that is fixed to the aircraft landing gear. According to the present invention, the torque is transmitted from the piston carrier to a torque arm housing that in turn is connected to the torque arm and strut assembly of the aircraft. The piston carrier and torque arm housing are not integrally formed. Torque is transmitted from the piston carrier to the torque arm housing by a series of torque pistons mounted in the piston carrier that engage a cam ring in the torque arm housing. Each torque piston receives metered brake pressure and exerts a portion of the torque force on the cam ring that is determined by the metered brake pressure acting over the area of the torque piston. If the torque per piston asserted by the brake exceeds this value, the torque pistons are forced inwardly by the cam ring that is transmitting reaction torque from the aircraft structure through the torque arm housing. A valve is associated with at least one of the torque pistons and closes when the torque piston moves inwardly under the force of the cam ring so as to isolate the brake pistons from metered brake fluid pressure, essentially trapping the brake fluid in the brake pistons at the pressure existing at the time the torque piston valve closes. After the torque piston valve closes continued motion of the torque pistons creates an expansion chamber in communication with the brake pistons. A portion of the trapped fluid from the brake piston cylinders flows into the expansion chamber thereby lowering the pressure in the brake piston cylinders and allowing the brake to release to reduce torque.

The limiting torque value is directly proportional to the metered brake pressure since the torque pistons are driven by the metered brake pressure. The gain from metered brake pressure value to torque value is determined by the piston and cam dimensions used in the particular system design. If the pilot meters full system pressure to the brakes, the torque limit is at the maximum design limit. If only half system pressure is metered to the brakes, then the torque limit is at half the design maximum.

In the illustrated embodiment of the invention a check valve is associated with the torque piston to allow the release of fluid from the brake piston cylinders back to the fluid supply should the metered brake pressure be relieved at a time when the torque piston valve is closed.

BRIEF DESCRIPTION OF THE DRAWINGS

The operation, construction and advantages of the present invention will be better understood by those of ordinary skill in the art and others upon reading the ensuing specification taken in conjunction with the appended drawings, wherein.

DETAILED DESCRIPTION OF THE PREFERRED EMBODIMENT

Figure 1:
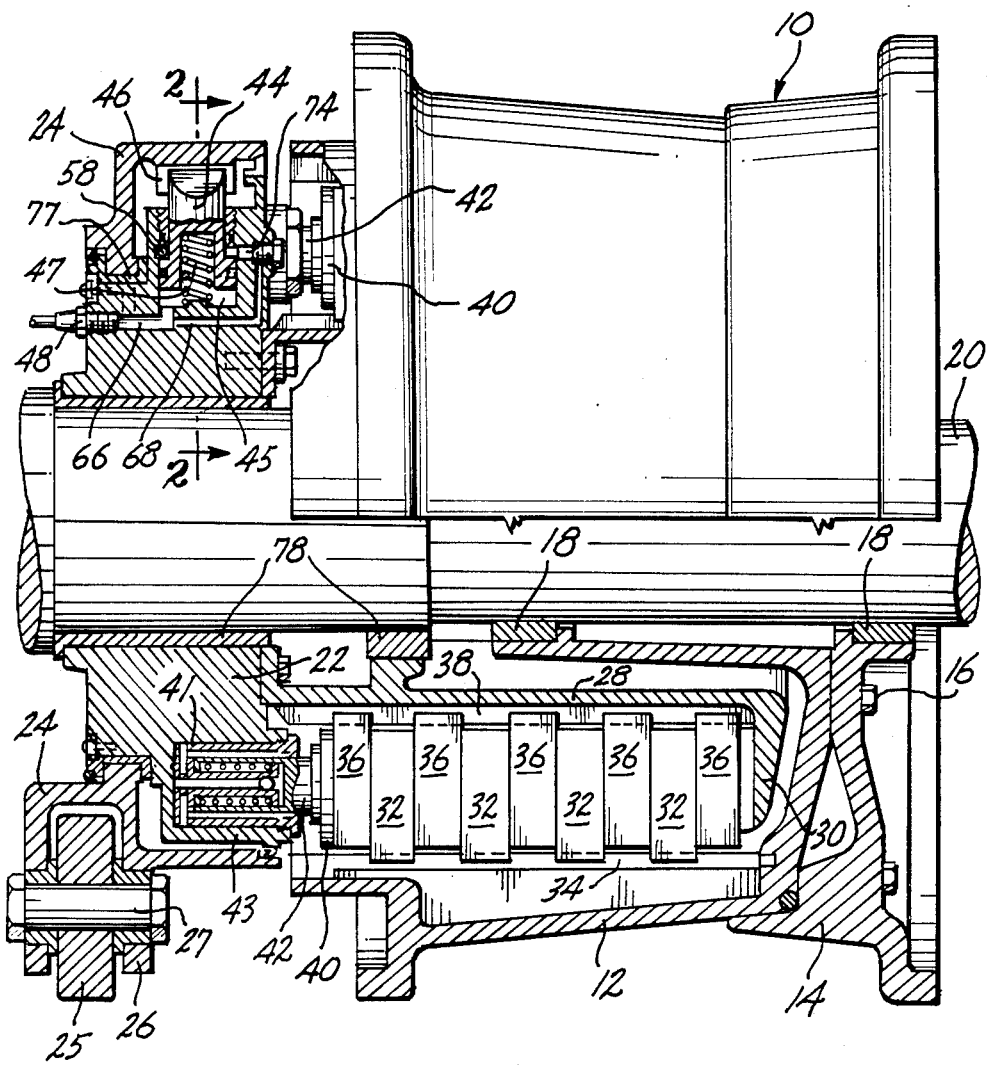
FIG. 1 is a somewhat schematic, partially sectional view of a torque-arm mounted brake and wheel system for an aircraft having one embodiment of the torque limiter of the present invention installed therein.

FIG. 1 illustrates a torque-arm mounted brake and wheel assembly such as could be used on commercial aircraft. A wheel 10 is defined by two annular pieces 12 and 14 fastened together such as by circumferentially-spaced bolts and nuts, generally indicated by 16. The wheel is rotatably journalled by bearing means 18 on a nonrotatable fixed axle 20 which in turn is carried by a conventional aircraft landing gear structure, which is not shown. The brake includes an annular piston carrier 22 which is carried within an annular torque arm housing 24 by bearings 77. The coupling between the piston carrier 22 and torque arm housing 24 will be described in greater detail below. The torque arm housing 24 is held in a nonrotatable manner with respect to the wheel, by attachment to a torque rod 25 which engages a torque arm clevis 26 integrally formed with the torque arm housing. The torque rod 25 is held in the torque arm clevis 26 by a pin fastener 27. The other end of the torque rod 25 is attached to a fixed element of the landing gear (not shown).

A generally cylindrical torque tube 28 is affixed to the piston carrier 22. Both the piston carrier 22 and the torque tube 28 are rotatably mounted on the axle by bearings 78. The torque tube 28 has an integrally-formed backplate 30. A plurality of spaced-apart annular brake rotor members 32 are suitably keyed to a plurality of circumferentially-spaced apart key or retaining members 34. The retaining members 34 are fixedly secured to wheel section 12 and are adapted to permit axial movement of the rotor members 32 relative to wheel section 12 while rotating therewith. A plurality of nonrotatable annular brake stator members 36 are interleaved with the rotor members 32 and keyed to a plurality of circumferentially-spaced apart spline sections 38 of the torque tube 28 for axial movement relative to the torque tube 28. Finally, a pressure plate 40 is suitably keyed to spline sections 38 for axial movement therealong.

The piston carrier 22 has a plurality of cavities 41 formed therein spaced circumferentially around the piston carrier. The cavities 41 have inserts 43 threadably engaged therein to form fluid cylinders which have disposed therein fluid-pressure responsive piston assemblies generally indicated as 42. The pistons 42 bear against the pressure plate 40 such that under the force of pressurized metered brake fluid within the cavity 41, the piston 42 is forced against the pressure plate 40 thereby axially displacing the pressure plate 40 towards the backing plate 30. The axial displacement of the pressure plate 40 compresses the rotor members 32 and stator members 36 into engagement thereby retarding the rotation of the wheel 10. The pistons 42 are adapted to have an axial travel sufficient to compensate for the accumulated axial wear of the frictional surfaces of stators and rotors 32 and 36. The illustrated brake piston assemblies include conventional adjuster mechanisms as developed and sold by Bendix Corporation to adjust the travel of the piston to account for wear of the rotor and stator disks. In operation, the torque produced by wheel 10 as it is retarded in its motion by the rotor and stator disks drives through the torque tube 28 and is received by the piston carrier 22 which is affixed to the torque tube. The braking torque is in turn transmitted from the piston carrier 22 to the torque arm housing 24 by the coupling between the piston carrier and the torque arm housing and is reacted by the aircraft structure through the torque rod 25, clevis 26 and pin 17.

Figure 2:
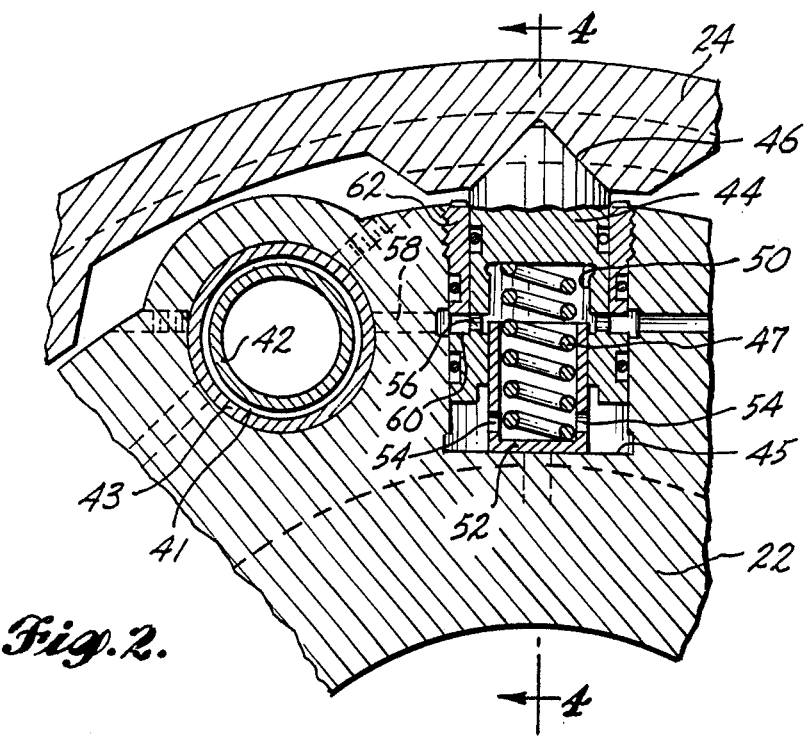
FIG. 2 is a sectional view of a portion of the piston carrier of FIG. 1 in larger scale with a torque piston made in accordance with the present invention mounted therein and shown in its fully extended position.
Figure 3:
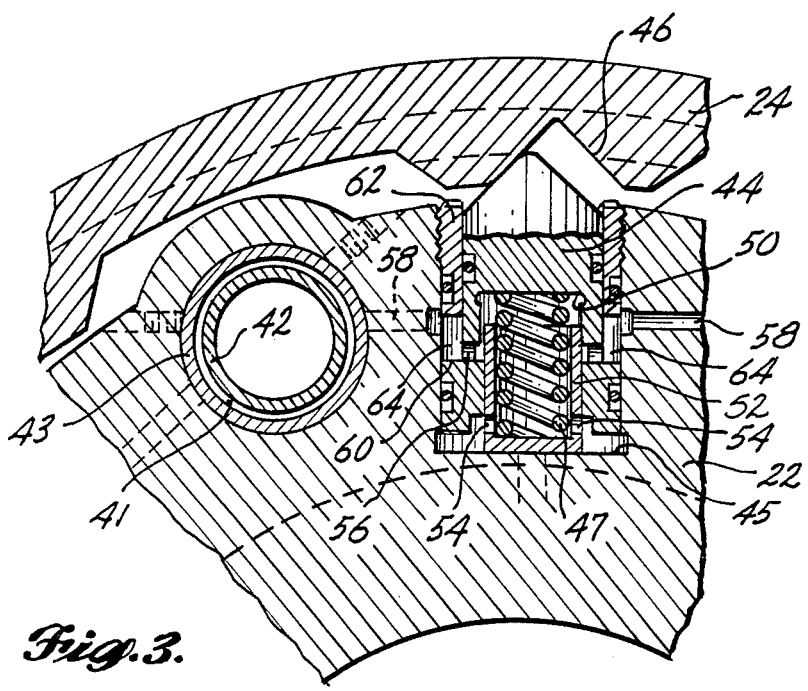
FIG. 3 is a sectional view of the portion of the piston carrier viewed in FIG. 2 with the torque piston in a partially compressed position.

The coupling between the piston carrier 22 and the torque arm housing 24 is accomplished by means of a plurality of torque pistons 44 which are mounted in cavities 45 formed in the piston carrier 22 and circumferentially spaced about the piston carrier. The torque pistons 44 extend radially about the piston carrier and engage ramp-shaped cam faces of the notches 46 formed on the interior of the torque arm housing 24. As best viewed in FIG. 2, a first end of the torque piston 44 is slanted in a double incline that engages the V-notch 46, when the torque piston 44 is in its initial state. The torque pistons 44 are maintained in engagement with their associated notches 46 in the torque arm housing 24 by return springs 47. Metered brake fluid flows to a piston carrier inlet fitting 48 which is in communication with a channel 66 that in turn communicates with the cavity 45 in which the torque piston is mounted. As viewed in FIGS. 2 and 3 the torque piston 44 has an axial bore 50 formed therein. A cylindrical valve slide 52 is centrally mounted axially in the cavity 45. The valve slide 52 also has an axial bore formed through it and has openings 54 in its lower end to allow the metered brake fluid to pass into the interior of the valve slide 52 and up into the interior bore 50 of the torque piston 44, which forms the valve sleeve. The valve slide 52 lies within the sleeve formed by the bore 50 in the torque piston but is stationary relative to the cavity 45. Metered brake fluid acts both on the lowermost surface of the torque piston 44 exterior to the valve slide 52 and also on the interior of the axial bore 50 to force the torque piston upwardly into engagement with the notch 46 in the torque arm housing 24. Openings 56 in the torque piston sidewalls are in communication with passages 58 leading to the cavities in which the brake pistons 42 are mounted to pass metered brake fluid to the brake pistons. While only one brake piston 42 and one torque piston 44 are shown in FIGS. 2 and 3, it will be understood that each brake piston has a torque piston associated therewith and the torque piston and brake piston pairs are circumferentially spaced about the piston carrier 22 with a typical piston carrier having eight brake piston/torque piston pairs. All of the brake piston and torque piston pairs are interconnected by bores formed through the piston carrier, such as by cross-drilling, as shown in FIGS. 2 and 3.

Torque piston 44 has two different diameters so that a shoulder 60 is formed at the junction of the two portions. An annular insert 62 is threadably engaged within the upper portion of the cavity 45 so that the diameter of the upper portion of the cavity is smaller than the diameter of the lower portion. In operation, the metered brake fluid acting on the torque piston 44 maintains the torque piston in engagement with the notch 46 in the torque arm housing 24 and the torque from the wheel 10 is passed through to the aircraft structure and reacted by that structure through the coupling between the torque pistons and the torque arm housing. The amount of torque that can be transferred from the piston carrier to the torque arm housing is determined by the force of the metered brake fluid acting on the cross-sectional area of the torque piston. When the reaction torque from the airframe exceeds the value at which any one torque piston can handle its share of the torque, the reaction torque will cause depression of the torque piston downwardly as viewed in FIG. 3, and there is slippage between the torque arm housing 24 and the piston carrier 22 as shown in FIG. 3. As the torque piston 44 moves downwardly, the valve sleeve formed by the interior surface of the bore 50 within the torque piston 44 meets the exterior walls of the valve slide 52 and blocks the opening 56 between the interior of the valve slide 52 and the brake piston cavity 41. When this occurs, the brake pistons are effectively isolated from metered brake fluid pressure and the pressure within the brake pistons is trapped at the value that it had at the time the opening 56 was shut off. The pressure of the fluid trapped in the brake cylinder is a function of the existing metered pressure. As the torque piston 44 then continues downwardly under the force of the reaction torque from the airframe as transmitted through the torque arm housing 24, an expansion space 64 is opened up that is defined by the exterior surface of the smaller diameter portion of the torque piston 44 and the interior wall of the cavity 45. As the expansion space 64 grows, brake fluid from the brake piston cavities 41 flows through passage 58 and fills the expansion space. Since the quantity of fluid in the brake piston cavity is fixed, the expansion of that volume of fluid into the larger area reduces the pressure on the brake piston 42, thereby reducing the brake effort and consequently holding the torque being produced by the brake to be consistent with a function of the metered pressure. If the brake torque is reduced due to inherent variable characteristics of the friction material, so is the reaction torque of the airframe, and therefore the metered brake fluid acting on the torque piston 44 forces it upwardly back into engagement with the associated notch 46 in the interior of the torque arm housing 24, opening up the passageway 56 between the interior of the torque piston and the brake piston cavity 41 so that the brake piston again is under control of metered brake fluid pressure.

The brake torque then builds up to be consistent with the metered pressure in spite of the change in brake material friction. The torque of the brake is therefore limited by first isolating the metered brake fluid from the brake piston and then providing an expansion space to lower the pressure of the fluid within the brake piston cavity so as to release the brakes, until such time as the torque is consistent with a predetermined gain relationship as a function of metered pressure.

Figure 4:
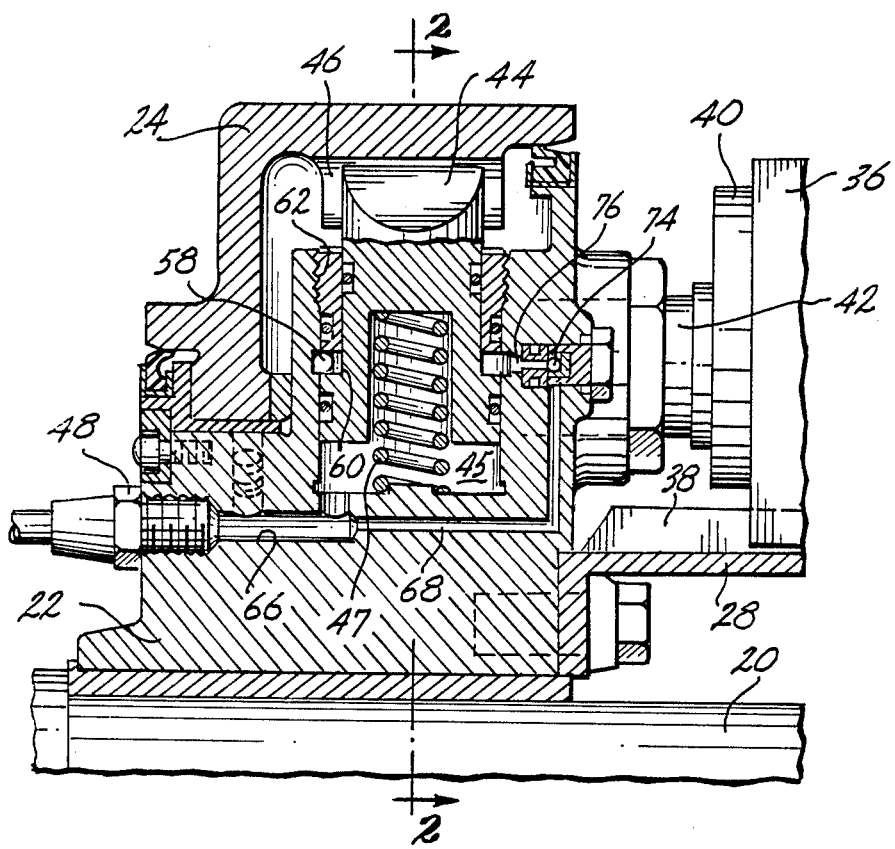
FIG. 4 is a view of a portion of the brake system of FIG. 1 in somewhat larger scale.

FIG. 4 is a sectional view of a portion of the brake assembly of FIG. 1, showing an embodiment of the torque pistons of the present invention that does not contain the valve assembly described above. At least one of the torque pistons must contain the integral valve assembly described above to control the torque. The actual number of valved torque pistons used will depend on the particular design response requirements. The remaining torque pistons, without valves, such as in FIG. 4, are driven radially outward by metered pressure in cavity 45 and all have expansion chambers connected in common by passage 58. FIG. 4 is a slightly larger scale than FIG. 1 and the fluid inlet fitting 48 is shown connected to a passageway 66 that channels the metered brake fluid to the torque piston's cavity 45. The channel from the torque piston cavity to the brake piston cavity is designated by reference numeral 58. A branch 68 of the passage 66 runs from the brake fluid inlet to a check valve 74 mounted in a passageway 76 that communicates with the torque piston cavity 45. The check valve 74 prevents flow of fluid from the brake fluid input through the valve 74 into the cavity 45. However, if the pilot disengages the brakes so that the metered brake fluid pressure drops to zero in the branch channel 68, the trapped fluid within the expansion space 64 will dump through the check valve 74 back into the channel 68 so that the brakes will release upon release by the pilot. If it were not for the check valve 74, it would be possible that in the event the pilot released the brakes while the torque pistons 44 were in their cut-off position blocking opening 56, as in FIG. 3, the brake fluid would be trapped in the brake cylinders so that the brakes would remain engaged, even though the pilot had ceased applying the brakes.

In the illustrated embodiment, the upper end of the torque piston 44 and the mating cam-face of notch 46 is ramp or wedge-shaped; however, other shapes are also possible to tune the control characteristics, such as hemispherical or other curved shapes. It should be noted that the torque piston and torque arm housing engagement surfaces are symmetric with respect to the wheel center. This allows one brake assembly to be used interchangeably on right- or left-hand rotating wheels. The torque piston length is such that the torque piston will bottom-out against the lower surface of the cavity 45 in which it moves before the uppermost end of the torque piston is low enough to slide under the ridge of the torque arm housing 24 that forms the notch 46 in which the torque piston engages. The length of the torque piston prevents the possibility of inadvertent large-scale movement between the torque arm housing 24 and the piston carrier 22 that could occur if the torque piston dropped below the lowermost edge of the notch 46. The return spring 47 within the torque piston is of a value that provides enough force to maintain the torque piston 44 in engagement with the torque arm housing 24 even when there is no pressurized fluid within the torque piston cavity. However, the return spring 47 has a negligible effect on torque resistance and the torque resistance of the torque piston is directly proportional to the fluid pressure acting on the area of the torque piston.

To summarize, a torque limiting system for a vehicle brake, such as an aircraft brake, is provided, that is mechanically operated and in which the torque is limited in direct proportion to the application of metered brake pressure. The brake system has a plurality of movable rotor members that rotate with the wheel, and a plurality of stationary stator members. A plurality of brake pistons are arranged circumferentially about the wheel to compress the stator and rotor members to provide braking by retarding motion of the wheel. The brake pistons are housed in a piston carrier that is coupled by the torque limiter to a torque arm housing which, in turn, is fixed to the aircraft structure. The torque limiter comprises at least one torque piston slidably mounted in a cavity within the piston carrier radially movable into engagement with a notch in the torque arm housing. The metered brake fluid is routed through the torque pistons to the brake pistons and a valve slide is associated with the torque pistons such that when the reaction torque exceeds a maximum predetermined torque, the torque piston is forced into said cavity which acts as a valve sleeve so that said valve slide and valve sleeve cooperate to isolate the brake piston from the supply of metered brake fluid. Further movement of the torque piston creates an expansion chamber in communication with the brake piston cylinders to provide for reduction of brake fluid pressure on the brake piston, thereby reducing brake pressure and thus reducing brake torque. Preferably, the torque piston is biased into engagement with the notch in the torque arm housing so that prior to application of brake pressure by the pilot, the torque piston is engaged with the notch in the torque arm housing. Also, preferably a plurality of torque pistons are circumferentially spaced about the wheel such that one torque piston is provided for each brake piston. All of the brake piston/torque piston pairs are interconnected by passageways that permit flow of metered brake fluid simultaneously to all of the torque piston/brake piston pairs.

While the above-described invention is particulary suited to a brake system having structural carbon brakes, it is also usable with any type of brake pad material including other organic materials, and steel. Further, it will be understood by those of ordinary skill in the art and others that while a preferred embodiment of the present invention has been described and illustrated herein, several changes can be made to that illustrative embodiment while remaining within the spirit and scope of the present invention. For example, the precise configuration of the end portion of the torque piston must be such as to cooperate with the notches formed in the torque arm housing. However, while a wedge-shaped head is provided in the illustrated embodiment, other head shapes are possible. Also, while the preferred embodiment of the torque limiter has eight torque pistons, each of which is associated with the eight brake pistons typically found in an aircraft wheel, other numbers of brake pistons and torque pistons can be provided depending on the particular situation. Further, while the illustrated and described embodiment has been discussed in the context of brakes for aircraft, and particularly large, commercial aircraft, it is possible to use the torque limiting system of the present invention with any other vehicle braking system, such as in cars or trucks, or smaller aircraft. Therefore, since such a wide variety of changes can be made to the embodiment without reaching beyond the scope of the invention, the invention should be defined solely with reference to the claims that follow.

The embodiments of the invention in which an exclusive property or privelege is claimed are defined as follows:

1. In a brake system having a plurality of rotors mounted to a wheel for rotation with the wheel and a plurality of stators interleaved with the rotors and coupled to a vehicle structure, wherein the rotors and stators are compressed by at least one fluidly actuated brake piston mounted within a brake cylinder formed in a piston carrier to restrain rotation of said wheel, a torque limiter system comprising:

at least one torque piston slidably mounted within a cavity formed in said piston carrier, said cavity being in fluid communication with said brake cylinder;

a torque arm housing affixed to said vehicle structure and surrounding a portion of said piston carrier and coupled to said piston carrier by engagement of said torque piston with a notch formed in said torque arm housing, a first surface of said notch abutting a first surface of said torque piston and upon rotational movement of said torque arm housing relative to said piston carrier said first surface of said notch exerting a force on said torque piston in an axial direction, said force tending to move said torque piston axially within said cavity; and, a valve means associated with said torque piston and operable in response to axial movement of said torque piston to block communication between said cavity and said brake cylinder, said torque piston defining a variable-sized expansion chamber in communication with said brake cylinder, the size of said expansion chamber increasing with increasing axial movement of said first torque piston in a first direction, said fluid in said brake cylinder being disposed within said expansion chamber to relieve pressure on said brake piston.

2. In a brake system having a plurality of rotors mounted to a wheel for rotation with the wheel and a plurality of stators interleaved with the rotors and coupled to a vehicle structure, wherein the rotors and stators are compressed by at least one fluidly actuated brake piston mounted with a brake cylinder formed in a piston carrier to restrain rotation of said wheel, a torque limiter system comprising:

at least one torque piston slidably mounted within a cavity formed in said piston carrier, said cavity being in fluid communication with said brake cylinder;

a torque arm housing affixed to said vehicle structure and surrounding a portion of said piston carrier and coupled to said piston carrier by engagement of said torque piston with a notch formed in said torque arm housing, a first surface of said notch abutting a first surface of said torque piston, and upon rotational movement of said torque arm housing relative to said piston carrier, said first surface of said notch exerting a force in a direction along the axis of said torque piston on said torque piston to axially move said torque piston within said cavity; and, a valve means associated with said torque piston and operable in response to axial movement of said torque piston to block communication between said cavity and said brake cylinder, said torque piston defining a variable-sized expansion chamber in communication with said brake cylinder, the size of said expansion chamber increasing with increasing axial movement of said torque piston in a first direction, said fluid in said brake cylinder being disposed within said expansion chamber to relieve pressure on said brake piston, and wherein brake fluid from a pilot-actuated brake control is metered to said brake cylinder through said cavity and valve means, said valve means including a cylindrical valve body coaxially mounted in said cavity with said torque piston, said cylindrical valve body having a bore axially formed therethrough, an opening in said wall of said valve body being in communication with said cavity and the bore to permit the flow of metered brake fluid through said valve body, said torque piston having an axial bore formed through at least a portion of said torque piston, said cylindrical valve body being slidably contained in sealed relationship within said bore in said torque piston, said torque piston having an opening in the sidewall thereof to allow communication between said axial bore and said brake cylinder, said valve body and said torque piston cooperating in such a manner that, upon a predetermined degree of movement of said torque piston, said valve body blocks said opening in said wall of said torque piston.

3. The torque limiter system of claim 2, wherein said brake system includes a plurality of said brake pistons circumferentially spaced about said wheel and said torque limiter system includes a plurality of said torque pistons circumferentially spaced about said wheel in proximity to said brake pistons.

4. The torque limiter system of claim 2 further including biasing means associated with each torque piston for biasing said torque piston into engagement with said notch in said torque arm housing.

5. The torque limiter system of claim 2 further including a passageway formed in said piston carrier from said expansion chamber to said brake fluid inlet and a check valve mounted in said passageway and operable to block the flow of fluid through said passageway from said brake fluid inlet to said expansion chamber and to permit the flow of fluid from said expansion chamber to said brake fluid inlet.

6. The torque limiter system of claim 2 further including limit means associated with said torque piston to limit the linear movement of said torque piston to a distance less than the depth of said notch.

7. The torque limiter system of claim 3, wherein said torque limiter pistons are arranged about said wheel such that the motion of said torque pistons are radially oriented with respect to said wheel.

* * * * *